United States Patent
Sugiyama et al.

(10) Patent No.: US 6,791,053 B2
(45) Date of Patent: Sep. 14, 2004

(54) CAD/CAM DEVICE FOR ELECTRIC DISCHARGE MACHINE

(75) Inventors: Kazuhisa Sugiyama, Tokyo (JP); Naoaki Kagiya, Aichi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/415,367

(22) PCT Filed: Dec. 12, 2001

(86) PCT No.: PCT/JP01/10907

§ 371 (c)(1),
(2), (4) Date: Jun. 12, 2004

(87) PCT Pub. No.: WO03/049891

PCT Pub. Date: Jun. 19, 2003

(65) Prior Publication Data

US 2004/0031774 A1 Feb. 19, 2004

(51) Int. Cl.$^7$ ................................................ B23H 7/20
(52) U.S. Cl. ...................... 219/69.14; 700/162; 700/182
(58) Field of Search ........................... 219/69.11, 69.14; 700/162, 182

(56) References Cited

U.S. PATENT DOCUMENTS

| | | | | |
|---|---|---|---|---|
| 4,755,651 A | * | 7/1988 | Tsutsui et al. | ........... 219/69.14 |
| 5,223,688 A | * | 6/1993 | Hosoda et al. | ........... 219/69.11 |

FOREIGN PATENT DOCUMENTS

| | | | |
|---|---|---|---|
| JP | 63-134126 A | * | 6/1988 |
| JP | 5-261620 | | 10/1993 |
| JP | 7-302108 A | * | 11/1995 |

* cited by examiner

Primary Examiner—Geoffrey S. Evans
(74) Attorney, Agent, or Firm—Sughrue Mion, PLLC

(57) ABSTRACT

A CAD/CAM device for an electric discharge machine comprises a check unit (32) for checking whether or not a level ($H_C$) of a clamp is lower than a safe level ($H_{LS}$) of the machining solution surface before conducting actual machining. The machining tank (7) can be automatically driven so that machining solution surface level $H_L$ is set at safe level ($H_{LS}$). Therefore, before the process of actual machining, it is possible to check whether or not the clamp device (5) is soaked in the machining solution (8) when machining is actually conducted.

4 Claims, 5 Drawing Sheets

CAD/CAM DEVICE FOR ELECTRIC DISCHARGE MACHINE

TECHNICAL FIELD

The present invention relates to improvements in a CAD/CAM device used for an electric discharge machine that conducts electric discharge machining on a workpiece by supplying electric power for machining to between an electrode and the workpiece.

BACKGROUND ART

FIG. 4 is an arrangement view of an electric discharge machine. In the view, reference numeral 1 is a mechanical body of the electric discharge machine, reference numeral 2 is a control section of the electric discharge machine, reference numeral 3 is a motor of Z-axis, reference numeral 4 is a head, reference numeral 5 is a clamp device, reference numeral 6 is a surface plate, reference numeral 7 is a machining tank, reference numeral 8 is an insulating machining solution stored in the machining tank 7, reference numeral 9 is a motor for driving the machining tank, reference numeral 10 is a manual switch for elevating the machining tank, reference numeral 11 is an automatic electrode replacing device, reference numeral 12 is a machining electric power supply means, reference numeral 13 is a memory for storing an NC program, reference numeral 14 is an NC program analysis section, reference numeral 15 is a shaft drive section, reference numeral 16 is a machining tank drive section, reference mark E is an electrode, reference mark W is a workpiece, and reference mark $H_L$ is a level of a surface of the machining solution.

The shaft drive section 15, the motor 3 of Z-axis and motors of X-axis and Y-axis, which are not shown in the view, correspond to a positioning means. The machining tank drive section 16 and the machining tank drive motor 9 correspond to a machining tank drive means for changing level $H_L$ of the surface of the machining solution with respect to workpiece W when the machining tank 7 is driven and made to ascend and descend.

Electrode E can be attached to and detached from the clamp device 5 of the head 4 by the automatic electrode replacing device 11. Electrode E is attached to the clamp device 5 of the head 4, and workpiece W is put and fixed onto the surface plate 6 arranged in the machining tank 7. Under the above condition, electrode E and workpiece W are relatively positioned by the positioning means, and then electric discharge is generated in the machining solution 8 while voltage is being impressed upon between electrode E and workpiece W by the machining electric power supply means 12. When electric discharge is generated between electrode E and workpiece W, workpiece W is melted and removed, so that electric discharge machining can be carried out.

An NC program for giving a command of operation of the electric discharge machine is stored in the memory 13. This NC program is analyzed by the NC program analysis section 14. This NC program analysis section 14 outputs moving commands to the shaft drive section 15 and the machining tank drive section 16.

An ascending and descending motion of the machining tank 7 is carried out by the machining tank drive motor 9 that is driven by the machining tank drive section 16. When the machining tank 7 is made to ascend and descend by the machining tank drive motor 9, level $H_L$ of the surface of the machining solution is changed with respect to the position of workpiece W. For example, as disclosed in JP-A-5-261620, level $H_L$ of the surface of the machining solution is set at a position higher than the level of workpiece W by a distance not less than 50 mm, for example, level $H_L$ of the surface of the machining solution is set at a position higher than the level of workpiece W by a safe distance of about 100 mm. The reason why level $H_L$ of the surface of the machining solution is set at the position described above will be explained as follows. When level $H_L$ of the surface of the machining solution is too low with respect to the level of workpiece W, electric discharge is conducted in air. Accordingly, there is a possibility of the occurrence of fire. When level $H_L$ of the surface of the machining solution is too high with respect to the level of workpiece W, it is difficult for an operator to observe a state of electric discharge. Further, the clamp device 5 is soaked in the machining solution 8, which could cause a mechanical breakdown.

When machining solution surface level $H_L$ is set at a level which is obtained when a safe distance is added to the level of workpiece W (This level is referred to as "safe level" $H_{LS}$ hereinafter.), it is necessary for an operator to adjust the level of the machining tank 7 by the manual switch 10 for ascending and descending the machining tank or alternatively it is necessary for an operator to give a command of the safe level or safe distance by an NC program. Each time the level of workpiece W is changed, safe level $H_{LS}$ must be adjusted, and further the operator must always conduct the adjustment.

FIG. 5 is a system arrangement view of the conventional CAD/CAM device 17. In the view, reference numeral 18 is an electrode drawing data, reference numeral 19 is a workpiece drawing data, reference numeral 20 is a path deciding section, reference numeral 21 is an NC program, reference numeral 22 is a path checking means, and reference numeral 23 is a display means such as a CRT.

In the conventional CAD/CAM device 17, the electrode drawing data 18 and the workpiece drawing data 19 are read in, and the path deciding section 20 decides a path of the machining motion according to the data which have been read in and the NC program 21 is created. The thus created NC program 21 is stored in the memory 13 arranged in the control section 2 of the electric discharge machine shown in FIG. 4. The path check means 22 confirms a path between electrode E and workpiece W.

As the method of checking the NC program 21, there are provided two methods. One is a method of graphic check conducted on a display of the display means 23, and the other is a method of dry-run check conducted by a dry running. The method of graphic check is conducted as follows. In the graphic check, the machine is not actually operated but the NC program 21 is operated on the display means 23 or the display of the electric discharge machine so as to conduct checking on each shaft. The path is graphically displayed on the display means 23 or the display of the electric discharge machine, so that operation of each shaft can be checked by the coordinate values shown on the display. In the method of dry-run check, operation of each shaft is checked while the machine is being operated. Dry running in which the workpiece is not actually machined is conducted while the machining solution 8 is not being provided, so that operation of each shaft can be checked at high speed.

Setting of level $H_L$ of the machining solution at safe level $H_{LS}$ depends upon the operator as described above. Therefore, it is impossible for the conventional methods of graphic check and dry-run check to check a positional relation between electrode E and level $H_{LS}$ of the surface of the machining solution. Accordingly, even if graphic check and dry-run check are conducted, the following problems may be encountered. When electrode E to be used is too short, the clamp device 5 is soaked in the machining solution 8 in the process of electric discharge machining. Alternatively, when machining is conducted at a deep position in the machining solution, the clamp device 5 is soaked in the machining solution 8.

When it is found that electrode E cannot be used as described above because the clamp device 5 has been soaked in the machining solution 8 after the actual machining process, electrode E must be manufactured again, which causes a decrease in the productivity and an increase in the manufacturing cost.

Especially in the case where a profile of workpiece W is complicated or a plurality of workpieces W, the level of which are different from each other, are present, and further in the case where machining is conducted while a plurality of electrodes E are being replaced by the automatic electrode replacing device 11, from the viewpoint of accomplishing automation, it is very important that safe level $H_{LS}$ necessary for actual machining operation is recognized and the machining tank 7 is automatically driven so that level $H_L$ of the surface of the machining solution can be set at safe level $H_{LS}$. Furthermore, in the case where the profile of workpiece W is complicated, it is necessary to precisely check the length of electrode E before actual machining operation is started.

DISCLOSURE OF THE INVENTION

The present invention has been accomplished to solve the above problems. It is an object of the present invention to provide a CAD/CAM device used for an electric discharge machine characterized in that: a safe level of an electrode can be recognized in an actual machining process and a machining tank is automatically driven so that a level of a surface of the machining solution can be set at the safe level; and even if a profile of a workpiece is complicated, it is possible to check whether or not a clamp device is soaked in the machining solution when actual machining is conducted.

The present invention provides a CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a check means for checking whether or not a level of a predetermined position of a device to be protected from being soaked in the machining solution is lower than a safe level of a surface of the machining solution when a safe level of the surface of the machining solution, which is obtained when a predetermined safe distance is added to a level of a predetermined position of the workpiece with respect to a predetermined reference position, is compared with the level of the predetermined position of the device with respect to the predetermined reference position before conducting actual machining.

The present invention provides a CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a check means for checking whether or not a level of a clamp is lower than a safe level of the machining solution when a safe level of the surface of the machining solution, which is obtained when a predetermined safe distance is added to a level of a predetermined position of the workpiece with respect to a predetermined reference position, is compared with a level of a clamp which is obtained when a length of the electrode is added to a level of a machining finishing position of the workpiece with respect to the predetermined reference position before conducting actual machining.

The present invention provides a CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a check means for checking whether or not a level of a clamp is lower than a safe level of the machining solution when a safe level of a surface of the machining solution, which is obtained when a predetermined safe distance is added to a level of a predetermined position of the workpiece with respect to a predetermined reference position on the basis of workpiece drawing data, is found and when a safe level of the surface of the machining solution is compared with a level of a clamp which is found when a length of the electrode is added to a level of a machining finishing position of the workpiece with respect to the predetermined reference position on the basis of electrode drawing data before conducting actual machining.

The present invention provides a CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a machining tank level deciding means for deciding a level of the machining tank so that a level of a surface of the machining solution can be a level obtained when a predetermined safe level is added to a level of a predetermined position of the workpiece which is found on the basis of workpiece drawing data, wherein an NC program to drive the machining tank drive means is outputted so that the level of the machining tank can be a value found by the machining tank level deciding means.

The CAD/CAM device for an electric discharge machine of the present invention is composed as described above. Therefore, it is possible for the device to recognize a safe level of a surface of a machining solution which is necessary when machining is actually conducted, and it is also possible for the device to automatically drive a machining tank so that a level of the machining solution in the machining tank can be set at the safe level. It is also possible for the device to check before machining is actually conducted whether or not a clamp device is soaked in the machining solution in the process of actual machining.

BEST MODE FOR CARRYING OUT THE INVENTION

Figure 1:
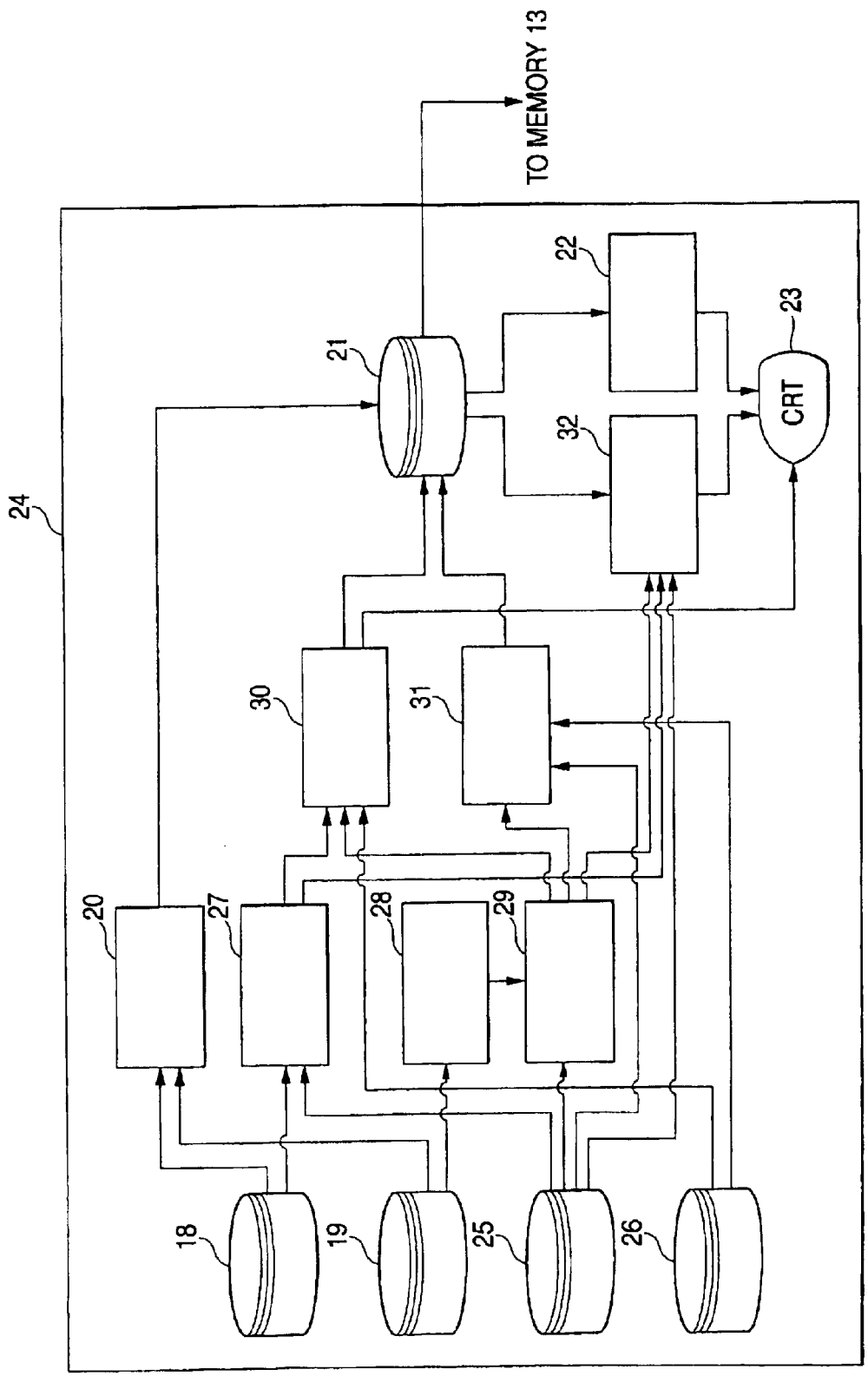
FIG. 1 is an arrangement view showing a CAD/CAM device for an electric discharge machine of an embodiment of the present invention.
Figure 5:
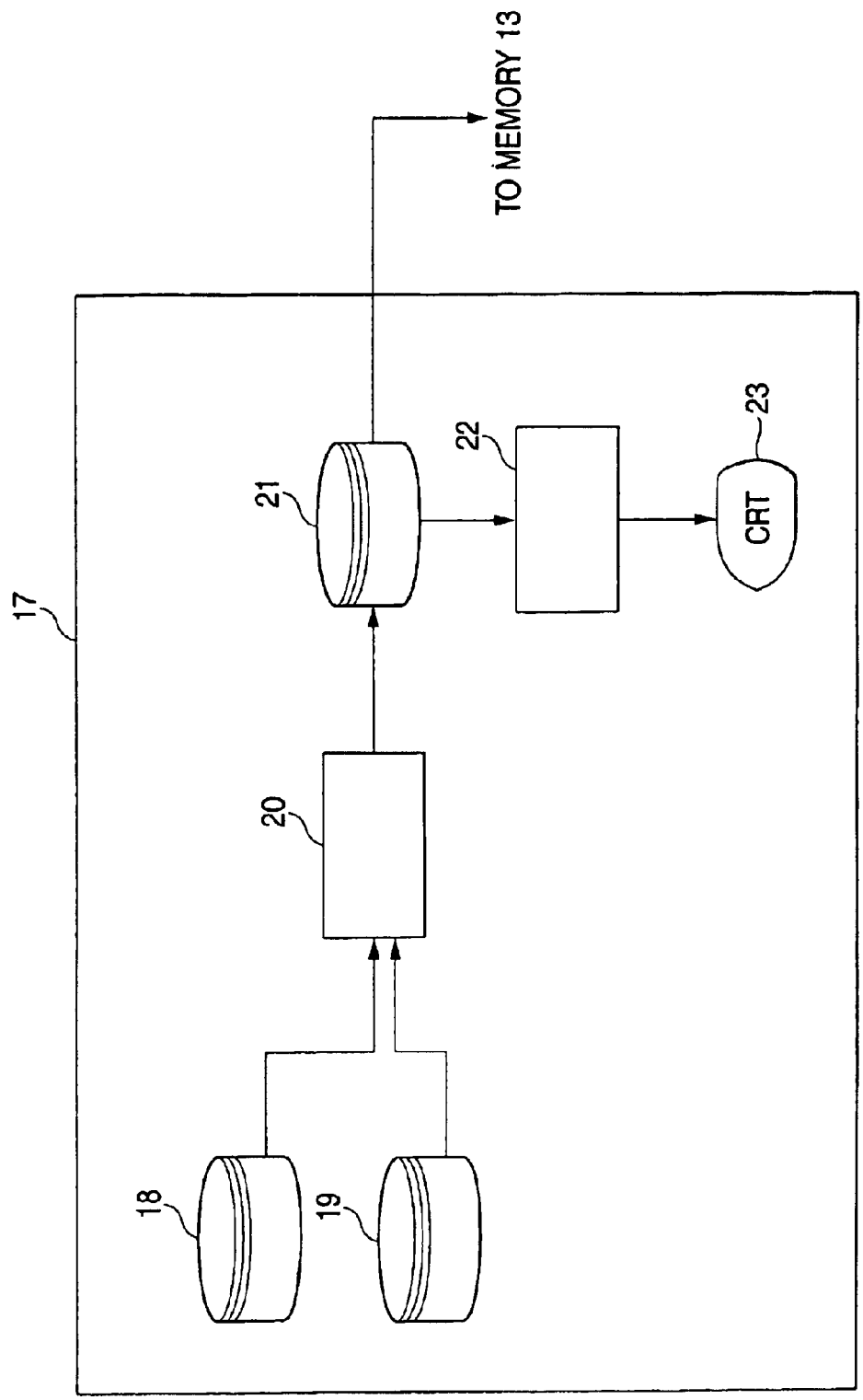
FIG. 5 is an arrangement view showing a conventional CAD/CAM device for an electric discharge machine.

FIG. 1 is an arrangement view showing a CAD/CAM device 24 for an electric discharge machine of an embodiment of the present invention. In the drawing, reference numeral 18 is electrode drawing data, reference numeral 19 is workpiece drawing data, reference numeral 20 is a path deciding section, reference numeral 21 is an NC program, reference numeral 22 is a path check means, reference numeral 23 is a display means such as a CRT, reference numeral 25 is a machine parameter, reference numeral 26 is a machining tank parameter, reference numeral 27 is an electrode length analysis section, reference numeral 28 is a workpiece level analysis section, reference numeral 29 is a workpiece actual machining level deciding section, reference numeral 30 is an electrode replacing time machining tank level deciding means, reference numeral 31 is a machining tank level deciding means, and reference numeral 32 is a check means for checking a length of an electrode. Like reference characters are used to indicate like parts in FIG. 1 and FIG. 5 in which the conventional CAD/CAM device 17 is shown.

Figure 4:
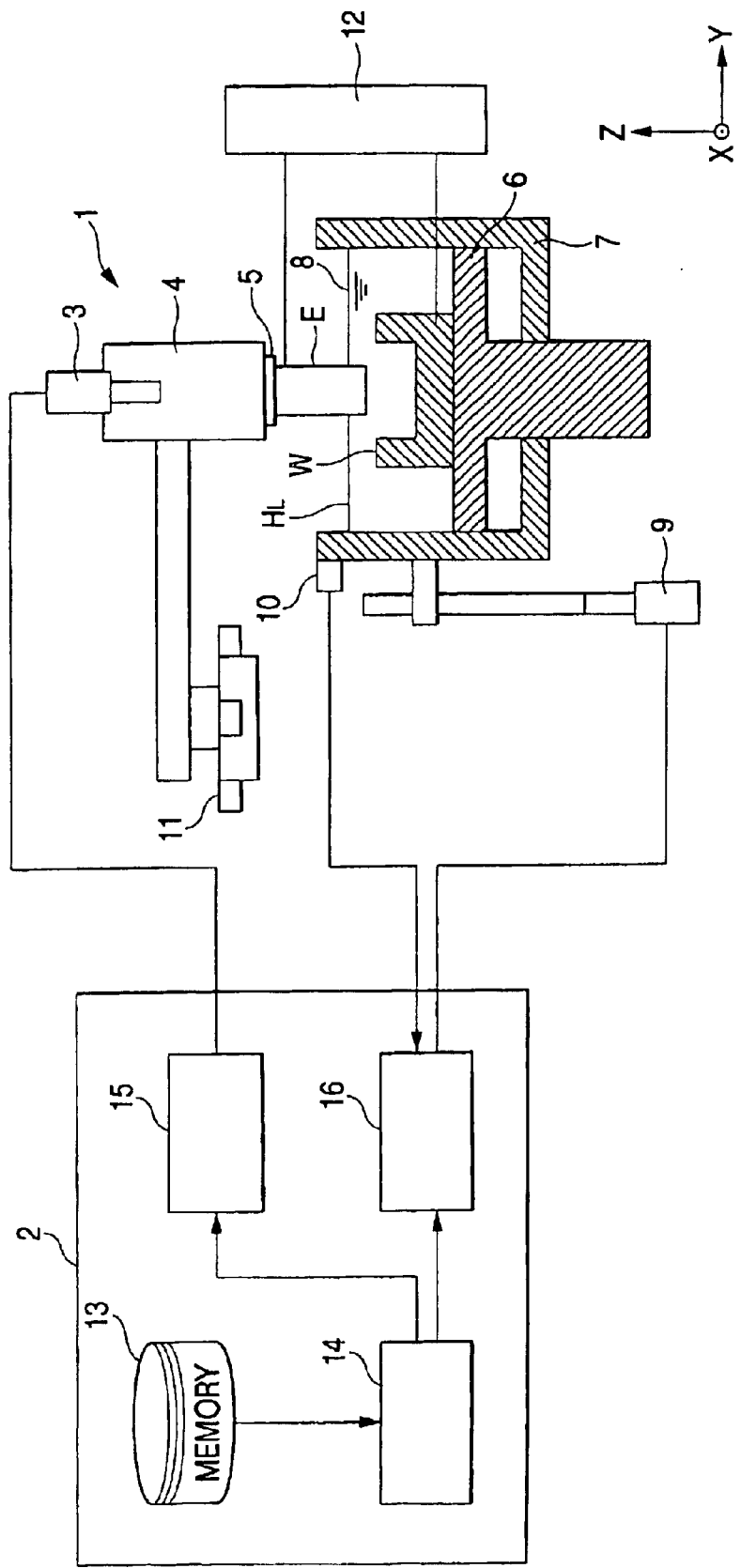
FIG. 4 is an arrangement view showing an electric discharge machine.

An arrangement of the electric discharge machine, in which the CAD/CAM device 24 for an electric discharge machine of the embodiment of the present invention is used, is the same as that shown in FIG. 4 explained in the prior art before. Therefore, explanations of the electric discharge machine will be omitted here.

Figure 2:
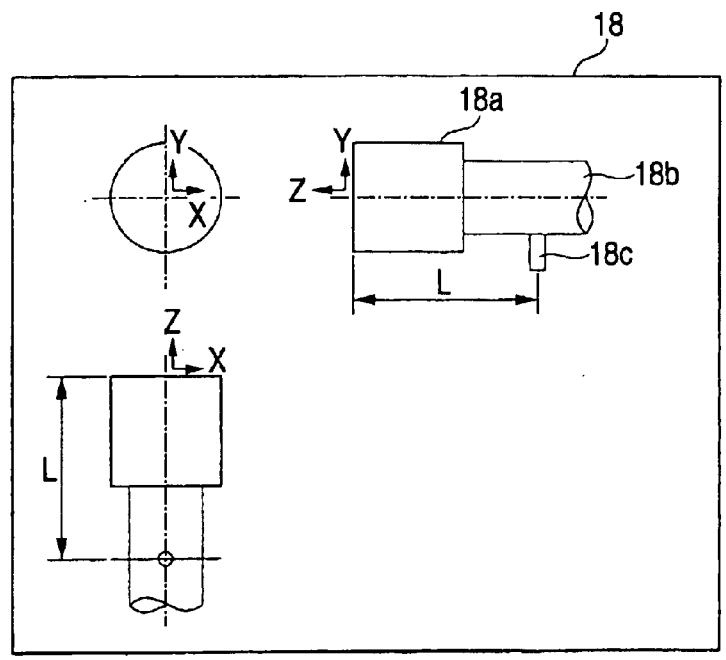
FIGS. 2(a) and 2(b) are schematic illustrations showing an example of electrode drawing data and also showing an example of workpiece drawing data.
Figure 2:
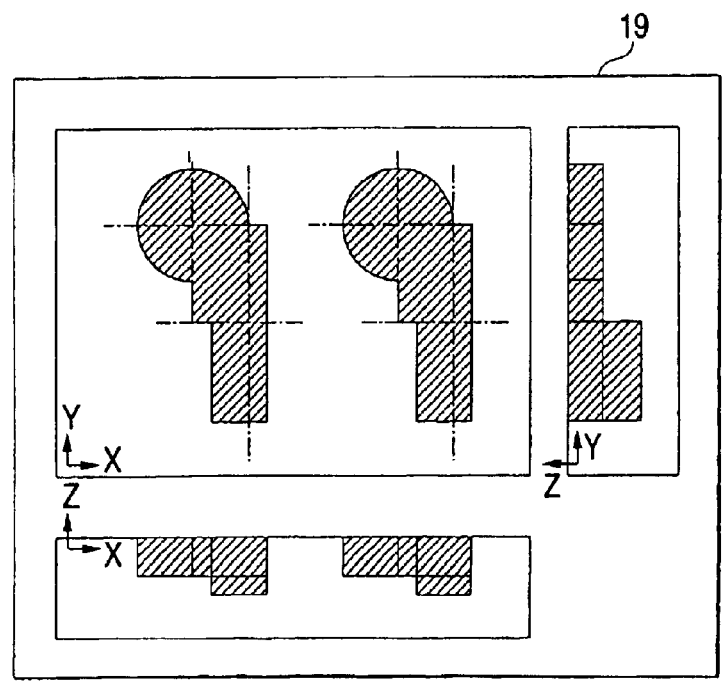

FIG. 2 is a schematic illustration showing an example of electrode drawing data 18 and also showing an example of workpiece drawing data 19. Electrode drawing data 18 shown in FIG. 2(a) has pieces of information such as the length L of electrode E. Reference numeral 18a is a body of electrode E, reference numeral 18b is a shank, and reference numeral 18c is a shank cross pin. Workpiece drawing data 19 shown in FIG. 2(b) has pieces of information such as the profile and level of workpiece W. A hatched portion of workpiece drawing data 19 shows a machining region.

In FIG. 1, the machine parameter 25 has pieces of information such as the level of the surface plate 6 and the safe distance, and the machining tank parameter 26 has pieces of information such as the level position of the machining tank 7. The workpiece level analysis section 28 finds a level of workpiece W from workpiece drawing data 19. In this case, it is possible to find a level of each workpiece W. It is also possible to find the maximum level of workpiece W for each workpiece W in the machining conducted once. Concerning the thus found level of workpiece W, a machine parameter in the direction of a level (direction of Z-axis), to which consideration should be given when machining is actually conducted, such as a level of the surface plate 6 is considered in the workpiece actual machining level deciding section 29, so that a level of actual machining of workpiece W with respect to a predetermined reference position can be decided.

Figure 3:
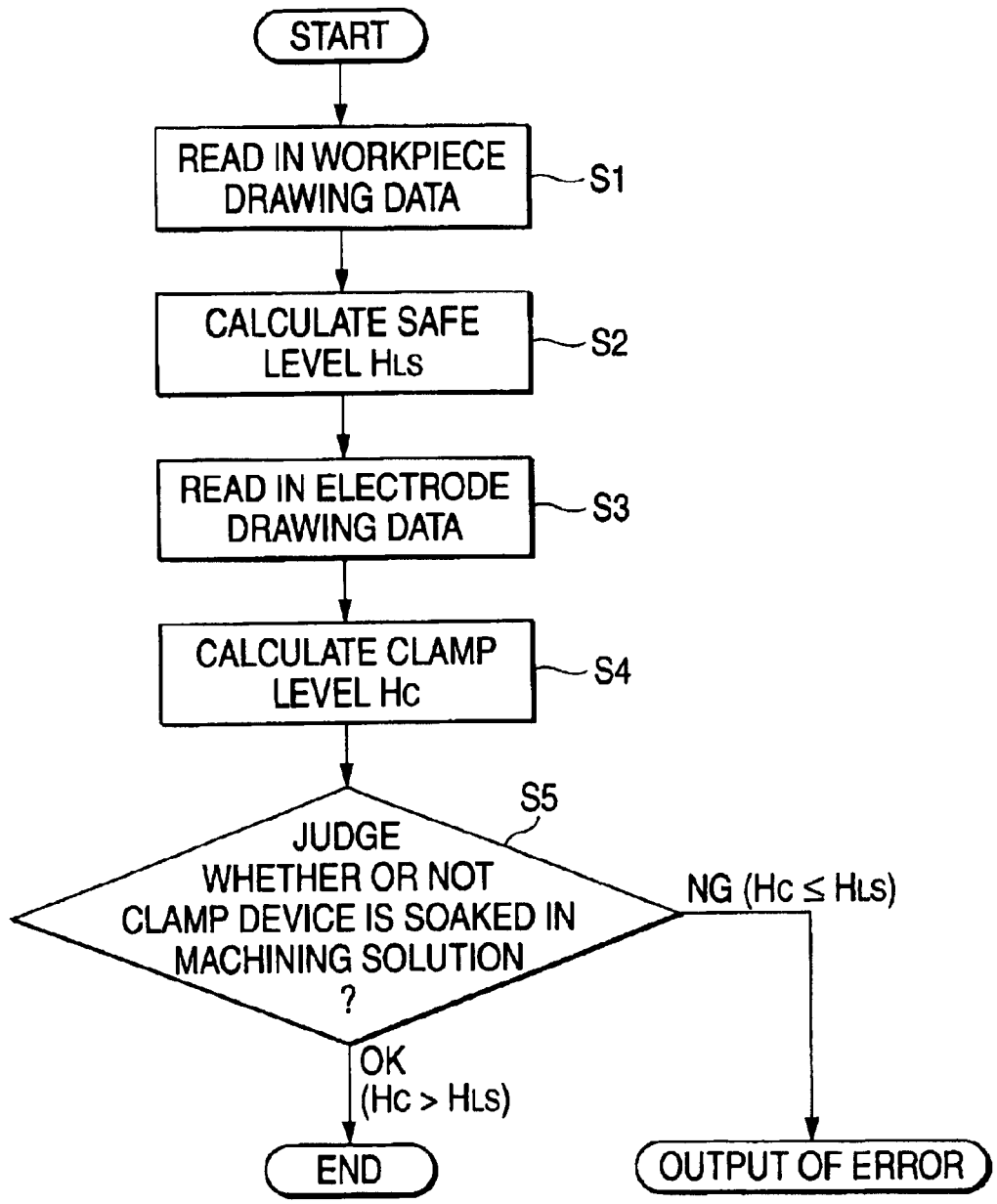
FIG. 3 is a flow chart showing a method of checking whether or not clamp level $H_C$ can be maintained at safe level $H_{LS}$.

FIG. 3 is a flow chart showing a method of checking before conducting actual machining whether or not a level of a position (this level is referred to as "clamp level" $H_C$ hereinafter), at which length L of electrode E is added to a level of a position at which machining of workpiece W is completed, can maintain safe level $H_{LS}$, that is, a level obtained when a safe distance is added to a level of an upper face of workpiece W. Steps from S1 to S5 will be explained as follows.

S1: Read in workpiece drawing data 19.
In this step, workpiece drawing data 19 is read into the workpiece level analysis section 28.

S2: Calculate safe level $H_{LS}$.
In this step, a level of workpiece W is found by the workpiece level analysis section 28. On the basis of a level of workpiece W and also on the basis of information relating to a level of workpiece W such as a level of the surface plate 6 of the machine parameter 25, a level of an upper face of workpiece W with respect to a predetermined reference position of workpiece W is found by the workpiece actual machining level deciding section 29.

Next, safe level $H_{LS}$ is found by the check means 32 from pieces of information of the level of an upper face of workpiece W and the safe distance of the machine parameter 25.

S3: Read in electrode drawing data 18.
Electrode drawing data 18 is read into the electrode length analysis section 27.

S4: Calculate clamp level $H_C$.
A level of workpiece W is found by the workpiece level analysis section 28. On the basis of this level of workpiece W and also on the basis of information relating to a level of workpiece W such as a level of the surface plate 6 of the machine parameter 25, a level of actual machining with respect to a predetermined reference position of workpiece W is found by the workpiece actual machining level deciding section 29. A position of completion of machining (position in the level direction) is found by the check means 32 according to the NC program 21.

Next, clamp level $H_C$ is found by the check means 32 from length L of electrode E, which is found by the electrode length analysis section 27, and the machining completion position (position in the level direction).

S5: Judge whether or not the clamp device 5 is soaked in the machining solution 8.
Whether or not the clamp device 5 is soaked in the machining solution is judged from safe level $H_{LS}$, which is found in step S2, and clamp level $H_C$, which is found in step S4, by the check means 32 as follows.
In the case of $H_C > H_{LS}$, the clamp device 5 is not soaked in the machining solution 8. Therefore, it is judged to be normal. In the case of $H_C \leq H_{LS}$, the clamp device 5 is soaked in the machining solution 8. Therefore, it is judged to be abnormal. Therefore, an error signal is outputted on the display means 23 so as to warn an operator.

As described above, it is possible to check by the check means 32 before conducting actual machining whether or not the clamp device 5 is soaked in the machining solution 8.

In step S2 described before, a level of the upper face of workpiece W with respect to the predetermined reference position of workpiece W is found by the workpiece actual machining level deciding section 29. By the machining tank level deciding means 31, safe level $H_{LS}$ is found from a level of the upper face of workpiece W, which is sent from the workpiece actual machining level deciding section 29, and also from information of the safe distance of the machine parameter 25. Further, from information of the machining tank parameter 26, it is possible to find a position of the machining tank 7 at which machining solution level $H_L$ becomes safe level $H_{LS}$.

Accordingly, it is possible to output an NC code, by which the machining tank 7 is moved so that machining solution surface $H_L$ can become safe level $H_{LS}$, from the machining tank level deciding means 31 to the NC program 21. Due to the foregoing, a position of the machining tank 7 to realize safe level $H_{LS}$ is outputted into the memory 13 of the control section 2 of the electric discharge machine shown in FIG. 4 as the NC program 21. When the NC program 21 stored in the memory 13 is analyzed by the NC program analysis section 14 and a movement command is sent to the machining tank drive section 16, the machining tank 7 can be moved to a position at which machining solution surface level $H_L$ can become safe level $H_{LS}$.

Since the NC program 21 to give a movement command to the machining tank drive section 16 is made as described above, it is possible to automatically set machining solution surface level $H_L$ at safe level $H_{LS}$ in the process of actual machining. Therefore, a burden imposed on an operator can be greatly reduced.

In the case where electrode E is replaced by the automatic electrode replacing means 11 shown in FIG. 4, a position of the machining tank 7 is decided by the electrode replacing time machining tank level deciding means 30 so that electrode E and the machining tank 7 can not interfere with each other, and an NC code by which the machining tank 7 is moved to this position may be outputted to the NC program 21.

In the case where a plurality of workpieces, the levels of which are different from each other, are provided, the position of the machining tank 7 may be controlled on the basis of a workpiece, the level of which is the largest. Alternatively, the position of the machining tank 7 may be controlled for each workpiece to be machined.

The above explanations are made into a case in which machining solution surface level $H_L$ is set at safe level $H_{LS}$ which is obtained when a safe distance is added to a level of the upper face of workpiece W. However, for example, in the case where a profile of workpiece W is complicated and machining is not started from an upper face of workpiece W, machining solution surface level $H_L$ may be set at a level which is obtained when a safe distance is added to a level of the machining start point of workpiece W, that is, safe level $H_{LS}$ may be set at a level obtained when a safe distance is added to a level of a predetermined position in workpiece W.

The above explanations are made into a case in which safe level $H_{LS}$ and clamp level $H_C$ are compared with each other for judgment so that the clamp device 5 can not be soaked in the machining solution 8. However, the present invention is not limited to the above case, that is, depending upon the constitution of an electric discharge machine, not clamp level $H_C$ but a level of another device to be protected from soaking in the machining solution 8 may be used.

Industrial Applicability

As described above, the CAD/CAM device used for an electric discharge machine of the present invention is suitably used for machining a workpiece by supplying electric power for machining to between an electrode and the workpiece. Especially, the CAD/CAM device used for an electric discharge machine of the present invention is suitably used for automatizing an electric discharge machining work.

What is claimed is:

1. A CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a check means for checking whether or not a level of a predetermined position of a device to be protected from being soaked in the machining solution is lower than a safe level of a surface of the machining solution when a safe level of the surface of the machining solution, which is obtained when a predetermined safe distance is added to a level of a predetermined position of the workpiece with respect to a predetermined reference position, is compared with the level of the predetermined position of the device with respect to the predetermined reference position before conducting actual machining.

2. A CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a check means for checking whether or not a level of a clamp is lower than a safe level of the machining solution when a safe level of the surface of the machining solution, which is obtained when a predetermined safe distance is added to a level of a predetermined position of the workpiece with respect to a predetermined reference position, is compared with a level of a clamp which is obtained when a length of the electrode is added to a level of a machining finishing position of the workpiece with respect to the predetermined reference position before conducting actual machining.

3. A CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a check means for checking whether or not a level of a clamp is lower than a safe level of the machining solution when a safe level of a surface of the machining solution, which is obtained when a predetermined safe distance is added to a level of a predetermined position of the workpiece with respect to a predetermined reference position on the basis of drawing data of the workpiece, is found and when a safe level of the surface of the machining solution is compared with a level of a clamp which is found when a length of the electrode is added to a level of a machining finishing position of the workpiece with respect to the predetermined reference position on the basis of drawing data of the electrode before conducting actual machining.

4. A CAD/CAM device for an electric discharge machine comprising: a machining tank for storing a machining solution; a positioning device for relatively moving a workpiece, which is fixed to a surface plate arranged in the machining tank, and an electrode; a machining electric power supply means for supplying machining electric power to between the workpiece and the electrode; and a machining tank drive means for changing a level of a surface of the machining solution with respect to the workpiece by driving the machining tank, the CAD/CAM device for an electric discharge machine further comprising a machining tank level deciding means for deciding a level of the machining tank so that a level of a surface of the machining solution can be a level obtained when a predetermined safe level is added to a level of a predetermined position of the workpiece which is found on the basis of drawing data of the workpiece, wherein an NC program to drive the machining tank drive means is outputted so that the level of the machining tank can be a value found by the machining tank level deciding means.

* * * * *

UNITED STATES PATENT AND TRADEMARK OFFICE
CERTIFICATE OF CORRECTION

PATENT NO. : 6,791,053 B2  
DATED : September 14, 2004  
INVENTOR(S) : Kazuhisa Sugiyama and Naoaki Kagiya Page 1 of 1

It is certified that error appears in the above-identified patent and that said Letters Patent is hereby corrected as shown below:

<u>Title page,</u>  
Item [86], PCT No.: PCT/JP01/10907 §371(c)(1),(2)(4)  
        date: delete "June 12, 2004" and insert -- April 28, 2003 --.

Signed and Sealed this

Tenth Day of May, 2005

JON W. DUDAS  
*Director of the United States Patent and Trademark Office*